Figure 1:
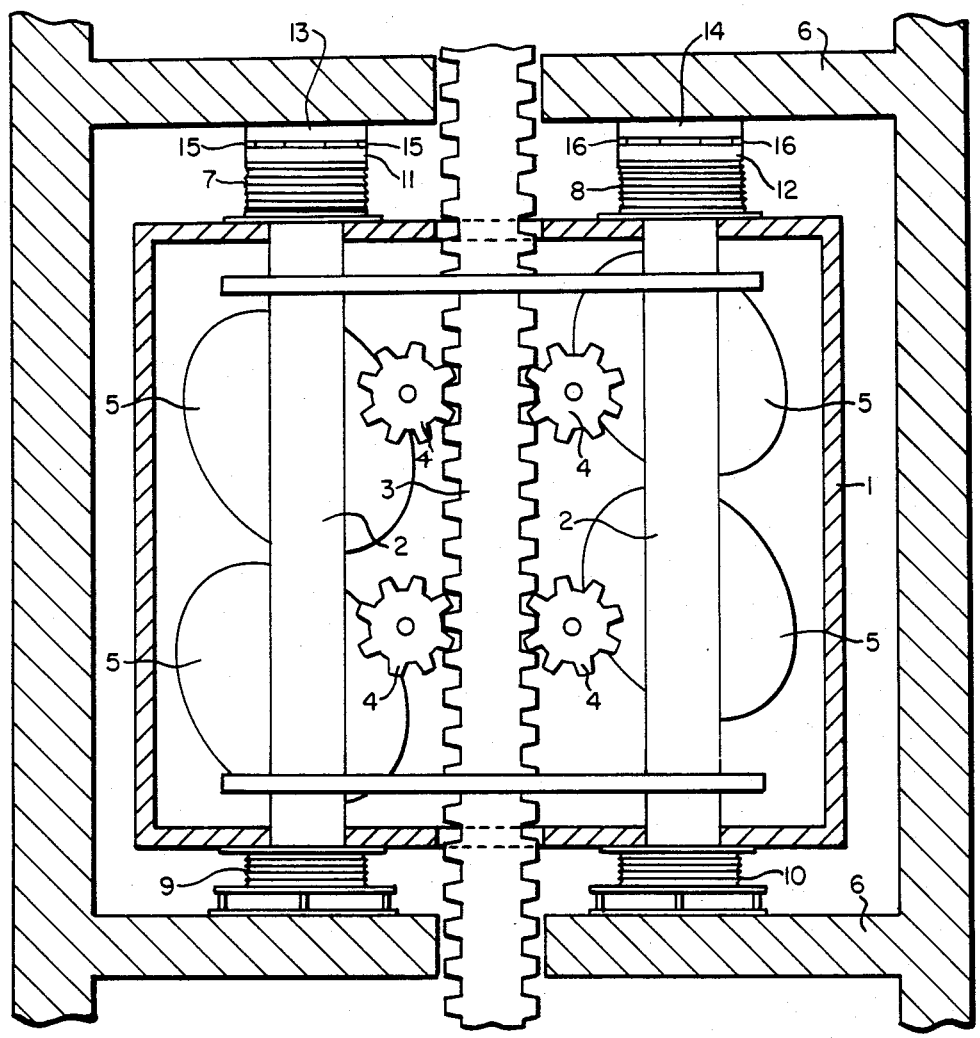

United States Patent [19]

Dantan

[11] Patent Number: 4,495,824
[45] Date of Patent: Jan. 29, 1985

[54] MEANS OF MEASURING STRESS AFFECTING MOUNTINGS FOR JACKING MECHANISMS ON OCEAN PLATFORMS

[75] Inventor: Olivier Dantan, Bouguenais, France

[73] Assignee: Brissonneau et Lotz Marine, France

[21] Appl. No.: 461,542

[22] Filed: Jan. 27, 1983

[30] Foreign Application Priority Data

Feb. 1, 1982 [FR] France ............................... 82 01536

[51] Int. Cl.³ .............................................. G01L 1/14
[52] U.S. Cl. ................................................. 73/862.64
[58] Field of Search ..................... 166/335, 336, 351; 73/151, 786, 862.62, 862.64; 405/197

[56] References Cited

U.S. PATENT DOCUMENTS

| 3,606,251 | 9/1971 | Willke et al. ........................ 254/89 |
| 4,083,237 | 4/1978 | Levesque ..................... 73/862.64 X |
| 4,425,056 | 1/1984 | Hunter ............................. 405/197 X |

FOREIGN PATENT DOCUMENTS

| 676658 | 4/1966 | Belgium . |
| 0056551 | 12/1981 | European Pat. Off. . |
| 2069404 | 9/1971 | France . |
| 2312603 | 12/1976 | France . |
| 2411270 | 7/1979 | France . |
| 2497248 | 7/1982 | France . |
| 696780 | 9/1953 | United Kingdom . |
| 558181 | 5/1977 | U.S.S.R. ........................... 73/862.64 |

*Primary Examiner*—Jerry W. Myracle
*Attorney, Agent, or Firm*—Rines and Rines, Shapiro and Shapiro

[57] ABSTRACT

The arrangement to which the invention pertains consists of a combination of calibrated compressible components (15), such as washers arranged in stacks, situated between an element (13) secured to the platform and another element (11) secured to a mounting which provides support for jacking mechanisms, accompanied by a sensor device (24) positioned according to the same conditions. The movable core (25) for the aforementioned sensor (24) is attached to a sliding element (21), which, in turn, is attached to the element identified as (13). Under these circumstances, the movable core (25), according to the positions which it may occupy, can modify connections for windings within the sensor. Data obtained in this manner is transmitted by a cable (28) to recording devices, as well as to direct reading devices or to indicators. Application for ocean platforms, notably for offshore drilling platforms.

5 Claims, 4 Drawing Figures

MEANS OF MEASURING STRESS AFFECTING MOUNTINGS FOR JACKING MECHANISMS ON OCEAN PLATFORMS

The present invention concerns ocean platform assemblies of the so-called self-raising type, which are specifically intended for conducting ocean drilling operations. These platform assemblies possess multiple legs, accompanied by multiple jacking mechanisms of the rack and pinion type, so as to permit adjustment of the position of the platform and secure positioning of said platform upon the aforementioned legs. For this purpose, at least one double rack containing rows of teeth situated opposite one another is firmly attached to each leg, for example, and is accompanied by a jacking mechanism which includes at least one pair of pinions secured to the platform structure by means of a mounting. Each of the aforementioned pinions respectively meshes with one of the two rows of teeth situated upon the rack cited heretofore, and the pinions are turned by means of drive components and reducing components, so as to allow necessary movement in one direction or another. The present invention pertains to an arrangement whereby it is possible, in any given instance, to determine the level of stress affecting any of the aforementioned mountings for jacking mechanisms on the platform, so as to permit completion of the appropriate procedures.

The present invention is applicable in terms of conventional platform assemblies, wherein flexible components are placed between mountings, to which the pinions are attached, and the platform structure itself, so as to allow limited sideways movement of the legs in relation to the platform structure, in accordance with the description furnished within U.S. Pat. No. 3,606,251, for example, and within French Patent Application No. 80 27914, which was filed on Dec. 31, 1980, issued as French Pat. No. 2,497,248.

In accordance with the present invention, calibrated compressible elements, along with the respective sensor devices, are placed between each mounting and corresponding portions of the platform, so that it shall be possible, in terms of stress affecting the mountings, to determine the relative positions of components which are respectively integral with said mountings and with the platform structure, with these positions being transmitted to recording devices or to devices which provide direct readings, in order that any adjustments which may be necessary on account of stress and changes in stress may be completed.

The present invention, as well as other purposes and advantages of said invention, can be more clearly understood in relation to the description furnished hereinafter, on the basis of the accompanying illustrations, which pertain to one version of the present invention, as a non-restrictive example thereof.

FIG. 1 provides a schematic illustration of a platform jacking mechanism, outfitted with a stress-measuring arrangement embodying the present invention.

Figure 2:
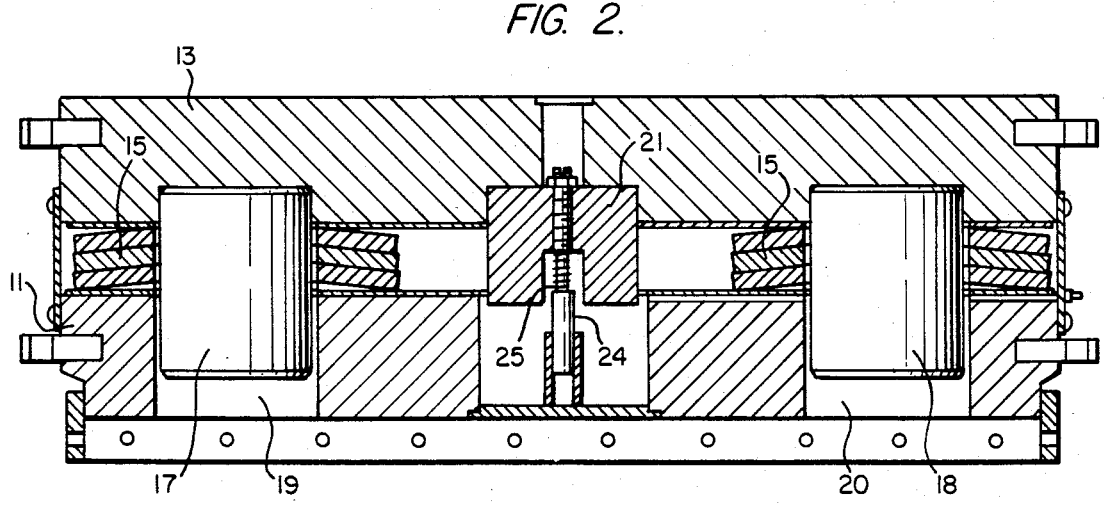

FIG. 2 provides a cut away illustration of the aforementioned stress-measuring arrangement as an entire unit.

Figure 3:
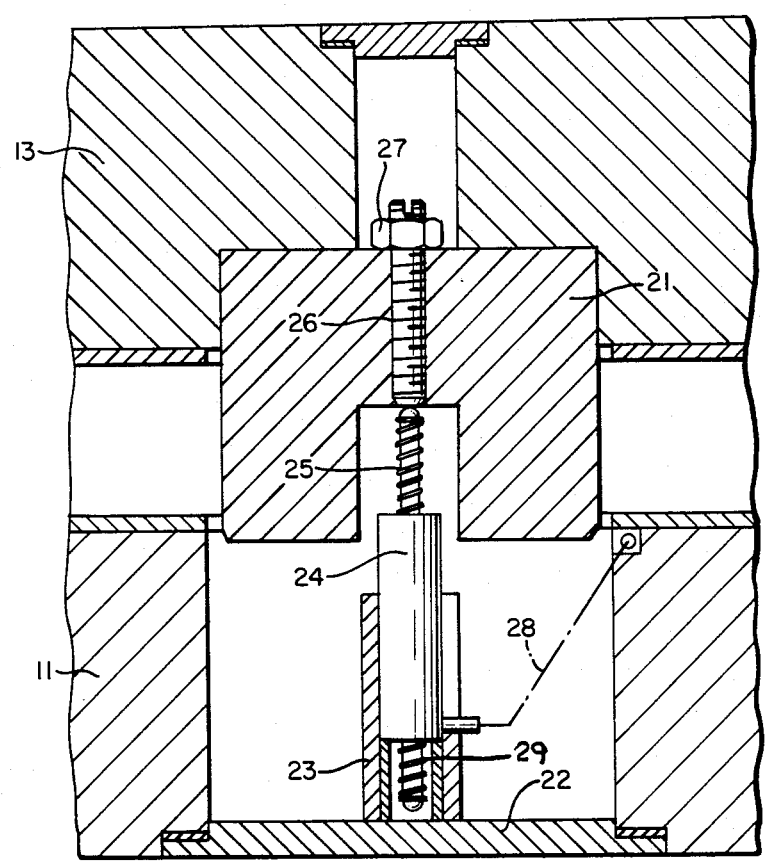

FIG. 3 provides a detailed illustration of the arrangement shown within FIG. 2, on a larger scale.

Figure 4:
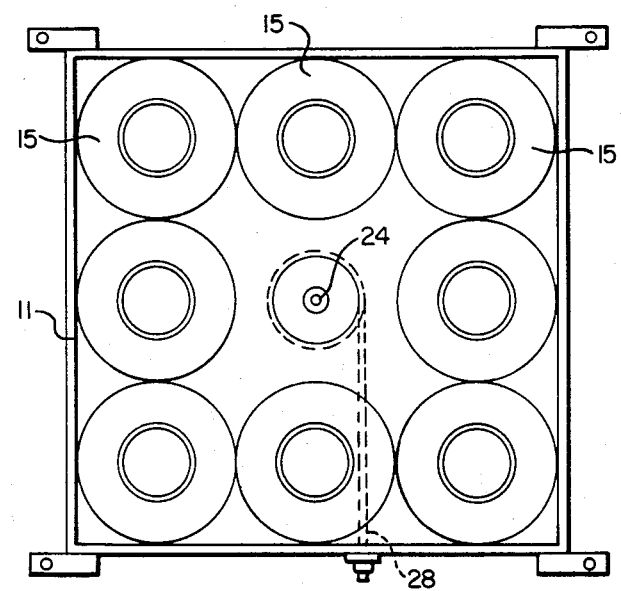

FIG. 4 provides an overhead view of a version of a stress-measuring arrangement embodying the present invention.

Within FIG. 1, reference numeral (1) identifies the housing for the mounting (2), which, in a conventional form, provides support for components (pinions—(4); drive components and reducing components—(5)) which control functioning of a rack (3), which is integral with a platform leg (6).

Reference numerals (7), (8), (9), and (10) identify relatively flexible elements which are ordinarily used to relieve axial and transversal stress upon the pinions supported by the mounting, notably stress resulting from motion of the sea. It should be kept in mind that these elements, for example, can consist of a set of metal plates, such as steel plates, which are intercalated with plates composed of a flexible material, in order to withstand compression stress adequately. The components to which the invention pertains are attached to the uppermost elements, (7) and (8).

Reference numerals (11) and (12) identify stationary elements which are respectively secured to the frame by means of the elements identified as (7) and (8).

Reference numerals (13) and (14) respectively identify elements which are secured to the platform structure.

Reference numerals (15) and (16) identify calibrated compressible elements shown within FIG. 2, in an enlarged form and in detail.

FIG. 2, in a more visible form than within FIG. 1, provides an illustration of the compressible elements (15) which are attached to the flexible elements (7) indicated within FIG. 1. These compressible elements, which can be produced from any appropriate type of material, specifically consist of stacks of calibrated washers (in this particular instance, there are three), which, in general, possess the shape of a slightly convex truncated cone, so that the compression, which is non-residual, shall depend upon the level of stress being applied.

The spindles, (17) and (18), which respectively slide within the housings identified as (19) and (20), guide movement of elements (11) and (13) in relation to one another, with said elements being respectively fastened to the mounting and to the platform structure.

The arrangement which permits obtaining and transmitting of data concerning the relative positions of the aforementioned elements, (11) and (13), is situated within a housing placed between these elements, and this arrangement includes a sensor device which shall be described in relation to FIG. 3.

In terms of the example which has been provided, the aforementioned sensor is a magnetic sensor with a differential transformer, wherein the moving core can change coupling between, windings, according to the particular positions which it occupies. Nevertheless, it is obvious that it is possible to use any type of sensor which permits the same results to be obtained.

The previously described arrangement for compressible elements (15) and for sensor devices combined with the flexible elements identified as (7) within FIG. 1 is entirely identical for the compressible elements (16) and for sensor devices combined with the flexible elements identified as (8) within FIG. 1.

The functioning of the previously cited arrangement shall now be described in terms of FIG. 3. The component identified as (21) is secured to the movable component identified as (13), whereas a collar (22) is secured to the component identified as (11), which is secured to the mounting. At the location identified as (23), the aforementioned collar (22) likewise constitutes a rest for the sensor device (24) with a moving core (25) attached to a return spring (29). The moving core (25) is fastened to the sliding piece identified as (21), by means of attachment consisting of a screw and a nut, (26) and (27).

Reference numeral (28) identifies a cable which includes power and transmission lines for the sensor device.

Under these circumstances, it can be understood that the component identified as (21), which is secured to the component identified as (13), shall set in motion the core (25) of the sensor (24), according to stress applied to the latter component (13), so that data generated by changes in coupling for the windings shall be transmitted along the cable (28) to recording devices, as well as to direct reading devices or indicators.

FIG. 4 provides a schematic plan view of a version of the present invention. Within this illustration, the same reference numerals are employed for items which are identical to those shown within other illustrations. In this instance, the calibrated compressible components (15) consisting of washers are arranged in the form of eight stacks. A single sensor device (24-25), with the cable identified by the reference numeral (28), is situated at the center of this arrangement.

It is to be understood that any modifications which may be introduced with the same intent by technically knowledgeable persons would not constitute departures from the context of the present invention, especially insofar as the number, shape, and arrangement of calibrated compressible components may be concerned, or the strength of said components, or the number and type of sensor devices to be employed, which can be selected according to the specific circumstances and conditions for use.

For example, it is also possible for the aforementioned compressible components to consist of a dynamometer with calibrated compression springs.

I claim:

1. In an ocean platform and the like in which the weight of the platform is applied, in compression, to legs by means of jacking mechanisms attached to the platform by mountings that include flexible components and that allow limited movement of the legs relative to the platform, the improvement comprising a combination of calibrated compressible components situated between the platform and at least one of the mountings, and at least one sensor device situated between the platform and said one of the mountings, said sensor device including means for producing an electrical output dependent upon the stress applied to said one of the mountings.

2. Apparatus in accordance with claim 1, wherein the compressible components and the sensor device form an assembly aligned with flexible components of said one of the mountings.

3. Apparatus in accordance with claim 2, wherein the compressible components comprise a stack of washers having the shape of truncated cones that deform, without residual deformation, in response to applied stress.

4. Apparatus in accordance with claim 3, wherein the compressible components comprise a plurality of stacks of said washers.

5. Apparatus in accordance with claim 1, wherein the sensor device is of the magnetic differential transformer type in which a moving core changes the coupling between windings.

* * * * *